(12) United States Patent
Lee et al.

(10) Patent No.: US 7,747,235 B2
(45) Date of Patent: Jun. 29, 2010

(54) METHOD AND APPARATUS PROVIDING A PLURALITY OF SERVICES VIA ONE CHANNEL IN MOBILE COMMUNICATION SYSTEM

(75) Inventors: Young-Dae Lee, HaNam-shi (KR); Sung-Duck Chun, Anyang (KR); Myung-Cheul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 435 days.

(21) Appl. No.: 11/391,751

(22) Filed: Mar. 28, 2006

(65) Prior Publication Data

US 2006/0223544 A1 Oct. 5, 2006

(30) Foreign Application Priority Data

Mar. 29, 2005 (KR) .......................... 10-2005-26231

(51) Int. Cl.
*H04B 1/18* (2006.01)
(52) U.S. Cl. .................. 455/154.1; 370/395.4; 455/434
(58) Field of Classification Search ................. 455/424, 455/400
See application file for complete search history.

(56) References Cited

U.S. PATENT DOCUMENTS

2006/0094441 A1* 5/2006 Beckmann et al. .......... 455/455
2006/0107287 A1* 5/2006 Lee et al. ...................... 725/32
2006/0156370 A1* 7/2006 Parantainen ................ 725/132

FOREIGN PATENT DOCUMENTS

| WO | WO 01/10146 A1 | 2/2001 |
|---|---|---|
| WO | 2004017540 | 2/2004 |
| WO | 2004017541 | 2/2004 |
| WO | WO 2004017649 A1 * | 2/2004 |
| WO | WO 2004/102831 A1 | 11/2004 |
| WO | 2005018098 | 2/2005 |

* cited by examiner

*Primary Examiner*—Rafael Pérez-Gutiérrez
*Assistant Examiner*—Marcos Batista
(74) *Attorney, Agent, or Firm*—Lee, Hong, Degerman, Kang & Waimey

(57) ABSTRACT

A method and apparatus for providing and receiving a plurality of services via a single channel in a mobile communications system is provided, by which a plurality of the services can be effectively provided via the single channel.

38 Claims, 13 Drawing Sheets

FIG. 8

| 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|----|----|----|----|----|----|----|----|
|   |   | CTCH | CTCH |   |   |   |   | CTCH | CTCH |   |   |   |   | CTCH | CTCH |   |   |

| Message type |
|---|
| Start point of next CBS schedule time |
| Length of next CBS schedule time |
| New message bitmap |
| message explanation |

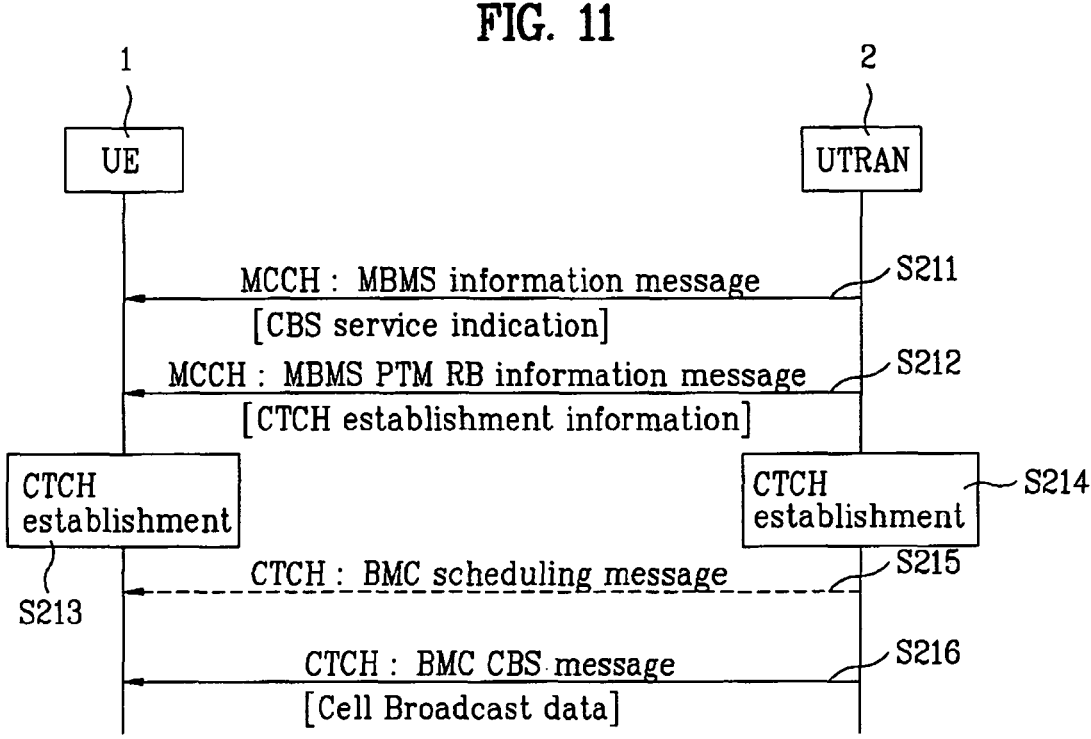
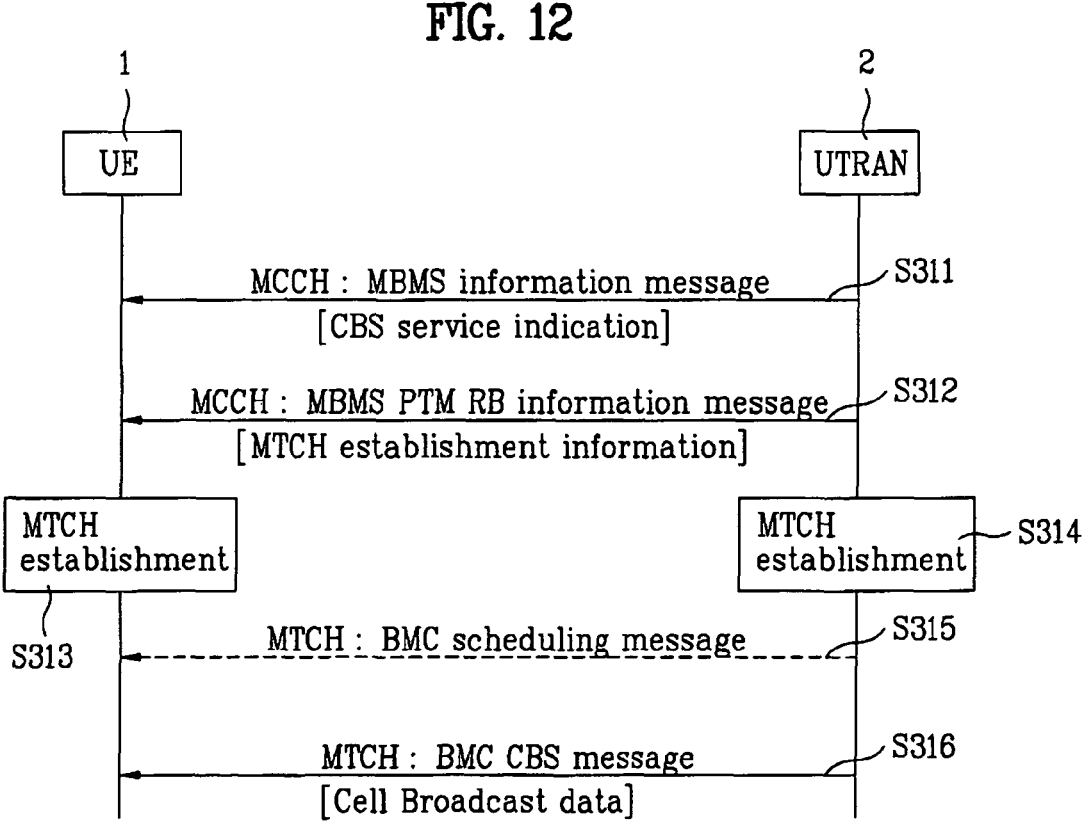

METHOD AND APPARATUS PROVIDING A PLURALITY OF SERVICES VIA ONE CHANNEL IN MOBILE COMMUNICATION SYSTEM

CROSS-REFERENCE TO RELATED APPLICATIONS

Pursuant to 35 U.S.C. §119(a), this application claims the benefit of earlier filing date and right of priority to Korean Application No. P2005-0026231, filed on Mar. 29, 2005, the contents of which is hereby incorporated by reference herein in its entirety

BACKGROUND OF THE INVENTION

1. Field of the Invention

The present invention relates to a mobile communications system, and more particularly, to a method and apparatus for providing a plurality of services via one channel in a mobile communications system. Although the present invention is suitable for a wide scope of applications, it is particularly suitable for a mobile communications system providing a short message transmission service together with a multimedia multicast/broadcast service, whereby a channel for the short message service and a channel for the multimedia multicast/broadcast service are provided via one physical channel and a control information transmission service for the two channels is provided via a control channel for the multimedia multicast/broadcast service.

2. Description of the Related Art

FIG. 1 is a block diagram of a network structure of a universal mobile telecommunications system (UMTS). Referring to FIG. 1, the universal mobile telecommunications system (hereinafter, referred to as 'UMTS') includes a user equipment 1 (hereinafter, referred to as 'UE'), a UMTS terrestrial radio access network 2 (hereinafter, referred to as 'UTRAN') and a core network 3 (hereinafter, referred to as 'CN'). The UTRAN 2 includes at least one radio network sub-system 4 (hereinafter, referred to as 'RNS') and each RNS includes a radio network controller 5 (hereinafter, referred to as 'RNC') and at least one base station 6 (hereinafter, referred to as 'Node B') managed by the RNC. The Node B 6 includes at least one cell.

FIG. 2 is an architectural diagram of a radio interface protocol between a UE 1 and UTRAN 2 based on the 3GPP (3rd Generation Partnership Project) radio access network specifications. Referring to FIG. 2, the radio interface protocol horizontally includes a physical layer, a data link layer and a network layer and the radio interface protocol vertically includes a user plane for data information transfer and a control plane for signaling transfer. The protocol layers in FIG. 2 can be divided into L1 (first layer), L2 (second layer), and L3 (third layer) based on lower three layers of the open system interconnection (OSI) standard model widely known in the communications systems.

The physical layer as the first layer provides an information transfer service to an upper layer using physical channels. The physical layer is connected to a medium access control (MAC) layer above the physical layer via transport channels through which data are transferred between the medium access control layer and the physical layer. Data is transmitted between different physical layers, and more particularly, between the physical layer of a transmitting side and the physical layer of a receiving side via physical channels.

The medium access control (MAC) layer of the second layer provides services to a radio link control (hereinafter abbreviated RLC) layer above the MAC layer via logical channels. The RLC layer of the second layer supports reliable data transfer and is operative in segmentation and concatenation of RLC service data units (SDUs) sent down from an upper layer.

A broadcast/multicast control (hereinafter abbreviated 'BMC') layer schedules a cell broadcast message (hereinafter abbreviated 'CB message') delivered from a core network and plays a role in broadcasting the message to UEs existing in a specific cell(s). In a UTRAN, a CB message delivered from a higher layer is additionally provided with information, such as a message ID, a serial number and a coding scheme. The CB message is delivered to an RLC layer as a BMC message and is then delivered to a MAC layer via a logical channel CTCH (common traffic channel). The logical channel CTCH is mapped to a transport channel FACH (forward access channel) and a physical channel SCCPCH (secondary common control physical channel).

The PDCP layer is located above the RLC layer and facilitates transferring data using IP packets, such as IPv4 or IPv6, efficiently in a radio section having a relatively small bandwidth. Toward this end, the PDCP layer performs header compression, a function by which mandatory data header information is transferred to increase transport efficiency in a radio section. The header compression scheme of RFC2507 or RFC3095 (robust header compression: ROCH) defined by IETF (Internet Engineering Task Force) can be used.

Since header compression is a basic function of the PDCP layer, the PDCP layer exists only in a packet service domain (hereinafter abbreviated 'PS domain'). Furthermore, one PDCP entity exists for each RB in order to provide an effective header compression function to each PS service.

A radio resource control (RRC) layer located on the lowest part of the third layer is defined in the control plane only and controls the logical channels, the transport channels, and the physical channels with configuration, reconfiguration, and release of radio bearers (RBs). An RB is a service offered by the second layer for the data transfer between the UE 1 and the UTRAN 2. Generally, configuring an RB refers to defining the characteristics of protocol layers and channels necessary for providing a specific service and is to establish respective specific parameters and operational methods for them.

A multimedia broadcast/multicast service (hereinafter, referred to as 'MBMS') offers a streaming or background service to a plurality of UEs 1 using a downlink dedicated MBMS bearer service. An MBMS is provided during one session, and data for the MBMS is transmitted to the plurality of UEs 1 via the MBMS bearer service during an ongoing session only. A UE 1 performs activation first for receiving the MBMS to which the UE has subscribed and receives the activated services only.

The UTRAN 2 provides the MBMS bearer service to at least one UE 1 using radio bearers. The radio bearers (RBs) used by the UTRAN 2 include a point-to-point radio bearer and a point-to-multipoint radio bearer.

The point-to-point radio bearer is a bi-directional radio bearer and is configured by a logical channel DTCH (dedicated traffic channel), a transport channel DCH (dedicated channel), and a physical channel DPCH (dedicated physical channel) or a physical channel SCCPCH (secondary common control physical channel). The point-to-multipoint radio bearer is a unidirectional downlink radio bearer and is configured by a logical channel MTCH (MBMS traffic channel), a transport channel FACH (forward access channel), and a physical channel SCPCH. The logical channel MTCH is configured for each MBMS offered to one cell and is used for transmitting user-plane data of a specific MBMS to a plurality of UEs.

As illustrated in FIG. 3, a logical channel MCCH (MBMS control channel) in a conventional system is a point-to-multipoint downlink channel used in transmitting control information associated with the MBMS. The logical channel MCCH is mapped to the transport channel FACH (forward access channel), while the transport channel FACH is mapped to the physical channel SCCPCH (secondary common control physical channel). A cell has only one MCCH.

The UTRAN 2 providing MBMS services transmits MCCH information through the MCCH channel to at least one UE 1. The MCCH information includes notification messages, specifically RRC messages related to the MBMS. For example, the MCCH information may include messages indicating MBMS service information, messages indicating point-to-multipoint radio bearer information or access information indicating that RRC connection for the MBMS is needed.

FIG. 4 is a diagram illustrating how MCCH information is transmitted in a conventional method. FIG. 5 illustrates a conventional method for providing an MBMS.

As illustrated in FIG. 4, the UTRAN 2 providing an MBMS service transmits the MCCH information to a plurality of UEs 1 via the MCCH channel. The MCCH information is periodically transmitted according to a modification period and a repetition period.

The MCCH information is categorized into critical information and non-critical information. The non-critical information can be freely modified each modification period or each repetition period. However, the critical information can be modified only each modification period.

Specifically, the critical information is repeated one time each repetition period. However, the modified critical information can be transmitted only at a start point of the modification period.

The UTRAN 2 periodically transmits a physical channel MICH (MBMS notification indicator channel) to indicate whether the MCCH information is updated during the modification period. Therefore, a UE 1 attempting to receive only a specific MBMS does not receive the MCCH or MTCH until a session of the service begins but receives the MICH (MBMS notification indicator channel) periodically. The update of the MCCH information refers to a generation, addition, modification or removal of a specific item of the MCCH information.

Once a session of a specific MBMS begins, the UTRAN 2 transmits an NI (notification indicator) through a MICH. The NI is an indication to a UE 1 attempting to receive the specific MBMS that it is to receive an MCCH channel. The UE 1, having received the NI via the MICH, receives an MCCH during a specific modification period indicated by the MICH.

The MCCH information is control information, specifically RRC messages, associated with an MBMS. The MCCH information includes MBMS modification service information, MBMS non-modification service information, MBMS point-to-multipoint RB information and access information.

A UE 1 attempting to receive a specific MBMS using a point-to-multipoint radio bearer receives MCCH information including radio bearer information via an MCCH and then configures the point-to-multipoint radio bearer using the received information. After configuring the point-to-multipoint radio bearer, the UE 1 keeps receiving a physical channel SCCPCH, to which an MTCH is mapped, in order to acquire data of the specific MBMS transmitted via the MTCH.

FIG. 6 is a diagram for explaining that UTRAN can transmit MBMS data discontinuously via MTCH. As illustrated in FIG. 6, a UTRAN 2 in a conventional system may transmit MBMS data discontinuously via the MTCH. In doing so, the UTRAN 2 periodically transmits a scheduling message to UEs 1 via an MSCH, specifically a SCCPCH carrying MTCH, to which an MTCH is mapped. The scheduling message indicates a transmission start timing point and transmission period of MBMS data transmitted during one scheduling period. The UTRAN 2 should previously inform the UE of a transmission period, specifically a scheduling period, of scheduling information.

The UE 1 obtains the scheduling period from the UTRAN 2 and then receives scheduling messages according to the scheduling period periodically. The UE 1 receives a SCCPCH carrying a MTCH discontinuously and periodically using the received scheduling messages. Specifically, according to the scheduling messages, the UE 1 receives the SCCPCH carrying the MTCH during times for which data is transmitted but does not receive the SCCPCH carrying the MTCH during times for which data is not transmitted. Using the above-described scheme, the UE 1 can receive data efficiently so that battery consumption may be diminished.

A cell broadcast service (hereinafter abbreviated CBS) associated with the BMC layer is a service for exchanging messages configured with characters and numerals between UEs 1, or between a UE and network 3 and is called a short message service (hereinafter abbreviated SMS). An SMS is classified into a cell broadcast short message service (hereinafter abbreviated SMS-CB), which sends a short message to at least one or more cells and a point-to-point Short message service (hereinafter abbreviated SMS-PP). As illustrated herein, the CBS corresponds to an SMS-CB and indicates a service that broadcasts a plurality of CBS messages to all users within a specific area.

A CBS message is a user message configured with characters and numerals. One CBS message is configured with one or more pages up to a maximum of 15. One page is configured with 82-octects that correspond to approximately 93-character information.

CBS messages are broadcast to a geographical area called a cell broadcast area. The cell broadcast area is constructed with one or more cells or an entire Public Land Mobile Network (PLMN). Each of the CBS messages is broadcast to a geographical area by a mutual contract between an information provider and a PLMN operator.

FIG. 7 is a block diagram of a network structure for a cell broadcast service. As illustrated in FIG. 7, CBS messages originate in a plurality of cell broadcast entities 11 (hereinafter abbreviated CBEs) connected to a cell broadcast center 13 (hereinafter abbreviated CBC). The CBE 11 separates the CBS message into a plurality of pages. The CBC 13 is one node of a core network 3 that performs a scheduling function by managing the CBS message.

Iu-BC is an interface defined between the CBC 13 and the RNC 5 using a service area broadcast protocol (hereinafter abbreviated SABP). The CBC can give the RNC a broadcast order for a new message or enable a previous broadcast message to be amended or stopped using the SABP.

The RNC performs a scheduling function for a CBS message delivered by the CBC and a broadcasting function to transmit the message to a specific cell using a BMC protocol. The RNC has a broadcast/multicast interworking function (hereinafter abbreviated BMC-IWF) above a BMC layer to perform an interpreting function for a message and information delivered from the CBC. The UE receives a CBS message broadcast by the UTRAN.

Examples of BMC messages used in the BMC protocol are a CBS message delivering user information, a schedule message facilitating reception of a CBS message by a UE and a CBS41 message delivering a short message delivered from an ANSI41 network. All the messages are transmitted only from the UTRAN to the UE. The UE can reduce its battery consumption by performing a discontinuous reception (hereinafter abbreviated DRX) using information in the schedule message delivered by the UTRAN.

Scheduling BMC messages for transmission is divided into two levels. A first level of scheduling is to determine a frame that can carry data of the CTCH.

FIG. 8 is a diagram for explaining a first level scheduling. As illustrated in FIG. 8, a logical channel CTCH is mapped to a physical channel S-CCPCH via a transport channel FACH. A first level of scheduling designates a frame of a physical channel usable in transmitting data of the logical channel CTCH prior to data transmission.

Numerals in FIG. 8 correspond to System Frame Number (SFN) values. As illustrated in FIG. 8, consecutive M-frames in the data carried over CTCH are always transmitted as a group and this frame group repeats a uniform frame according to a period N. The data carried over CTCH is always transmitted during two consecutive frames and is repeated according to a 6-frame period.

The frame group carrying CTCH data starts when an SFN value is 'K' and the frame group is repeated according to a period 'N'. As illustrated in FIG. 8, "K" is 2 and the frame group starts when an SFN value is 2 and the frame group is repeated according to a period of '6'.

The first level scheduling of BMC is performed identically for all CBS services of. Specifically, the same frame is allocated to all CBS services in the same cell. The RRC layer performs the first level scheduling and the value of 'N', 'K' or 'M' is included in the system information broadcast to a UE.

A second level scheduling divides the frame allocated in the first level scheduling into CBS schedule periods. The BMC layer performs the second level scheduling.

The UE receives a BMC schedule message and then acquires information during a CBS schedule time. The BMC schedule message includes information related to a length of the CBS schedule time and a start point of the CBS schedule time. The length of the CBS schedule time indicates a length between a start and an end of the CBS schedule time beginning after the BMC schedule message. The start point of the CBS schedule time indicates a difference between a transmission timing point of a current BMC schedule message and a start timing point of the CBS schedule time beginning after the BMC schedule message.

Therefore, a UE receiving a CBS message can determine when a CBS schedule time, which starts after reception of a BMC schedule message, begins and when the CBS schedule time ends. The UE can acquire information regarding a next CBS schedule time by receiving the BMC schedule message during the CBS schedule time. In this way, the UE can determine when no BMC message is transmitted and the UE can perform DRX in order to conserve battery power.

FIG. 9 is a configurational diagram of a conventional MC schedule message. As illustrated in FIG. 9, a BMC schedule message provides information related to one or more BMC messages that will be transmitted during a next CBS schedule time.

The new message bitmap parameter indicates whether each message transmitted during a next schedule time is a newly broadcast message or corresponds to a repeated transmission of a previously broadcast message. The message explanation parameter indicates information, such as message type and message ID, of each BMC message transmitted during a next CBS schedule time. The message type indicates whether a corresponding message is a CBS message, a schedule message or a CBS41 message.

Using conventional methods, the UTRAN offers MBMS and CBS independently. Specifically, since the MBMS channel and the CTCH channel are provided via different physical channels, if a UE attempts to receive an MBMS and a CBS simultaneously, the UE must receive separate physical channels for the MBMS and CBS.

Therefore, there is a need for a system for effectively radiating the heat generated to prevent problems associated with high temperature, densely packed circuit electrical components of a terminal for a mobile communication system.

SUMMARY OF THE INVENTION

Accordingly, the present invention is directed to a method and apparatus for providing a plurality of services via a single channel in a mobile communications system that substantially obviates one or more problems due to limitations and disadvantages of the related art. An object of the present invention is to provide a method and apparatus for providing and receiving a plurality of services via a single channel in a mobile communications system, by which a plurality of the services can be effectively provided via the single channel.

In one aspect of the present invention, a method of receiving a cell broadcast service in a mobile terminal adapted for use in a wireless communication system is provided. The method includes receiving, through a first channel, periodic information associated with receiving a message having a cell broadcast service (CBS) indication, receiving, through a second channel, the message having the CBS indication, the message periodically provided and received in response to the periodic information and receiving CBS data in response to the CBS indication.

It is contemplated that the first channel is a broadcast control channel. It is further contemplated that the second channel is a point-to-multipoint channel. [MCCH]

It is contemplated that the method further includes periodically receiving the second channel. It is further contemplated that the method further includes receiving the CBS data via a point-to-multipoint channel. Preferably, the point-to-multipoint channel is a cell broadcast traffic channel.

It is contemplated that receiving the message having the CBS indication includes receiving a point-to-multipoint information message. It is further contemplated that receiving the message having the CBS indication includes receiving a broadcast control scheduling message.

It is contemplated that the first channel is a point-to-multipoint control channel. It is further contemplated that receiving the message having the CBS indication includes receiving during a modification period and receiving the CBS data includes receiving during a corresponding modification period.

In another aspect of the present invention, a method of communicating a cell broadcast service in a wireless communication system is provided. The method includes transmitting, through a first channel, periodic information associated with transmitting a message having a cell broadcast service, transmitting, through a second channel, the message having the CBS indication, the message provided periodically and corresponding to the periodic information and transmitting CBS data corresponding to the CBS indication.

It is contemplated that the first channel is a broadcast control channel. It is further contemplated that the second channel is a point-to-multipoint channel.

It is contemplated that transmitting the CBS data includes transmitting via a point-to-multipoint channel. Preferably, the point-to-multipoint channel is a cell broadcast traffic channel.

It is contemplated that transmitting the message having the CBS indication includes transmitting a point-to-multipoint information message. It is further contemplated that transmitting the message having the CBS indication includes transmitting a broadcast control scheduling message.

It is contemplated that the first channel is a point-to-multipoint control channel. It is further contemplated that transmitting the message having the CBS indication includes transmitting during a modification period and transmitting the CBS data includes transmitting during a corresponding modification period.

In another aspect of the present invention, a mobile terminal adapted for use in a wireless communication system is provided. The mobile terminal includes an antenna unit adapted to receive RF signals containing periodic information associated with receiving a message having a cell broadcast service (CBS) indication, the message having the CBS indication and CBS data, an RF unit adapted to process the RF signals received by the antenna, a keypad for inputting information from a user, a storage unit adapted to store the periodic information, the cell broadcast CBS indication and the CBS data, a display adapted to convey information to the user and a processing unit adapted to process the periodic information received through a first channel, process the message having the CBS indication received through a second channel and process the CBS data, wherein the message having the CBS indication is periodically received and processed in response to the periodic information and the CBS data is processed in response to the CBS indication.

It is contemplated that the first channel is a broadcast control channel. It is further contemplated that the second channel is a point-to-multipoint channel.

It is contemplated that the processing unit is further adapted to periodically process the second channel. It is further contemplated that the processing unit is further adapted to process the CBS data via a point-to-multipoint channel.

It is contemplated that the point-to-multipoint channel is a cell broadcast traffic channel. It is further contemplated that the processing unit is further adapted to process a point-to-multipoint information message including the message having the CBS indication.

It is contemplated that the processing unit is further adapted to process a broadcast control scheduling message including the message having the CBS indication. It is further contemplated that the processing unit is further adapted to process the message having the CBS indication during a modification period and to process the CBS data during a corresponding modification period. Preferably, the first channel is a point-to-multipoint control channel.

In another aspect of the present invention, a network for providing a point-to-multipoint service to at least one mobile terminal is provided. The mobile network includes at least one transmitter adapted to transmit signals containing periodic information associated with transmitting a message having a cell broadcast service (CBS) indication, the message having the CBS indication and CBS data, a CBS unit adapted to generate the CBS data, and a controller adapted to control the at least one transmitter to transmit the periodic information through a first channel, transmit the message having the CBS indication through a second channel and transmit the CBS data, wherein the message having the CBS indication is periodically provided and the CBS data corresponds to the CBS indication.

It is contemplated that the first channel is a broadcast control channel. It is further contemplated that the second channel is a point-to-multipoint channel.

It is contemplated that the controller is further adapted to transmit the CBS data via a point-to-multipoint channel. It is further contemplated that the point-to-multipoint channel is a cell broadcast traffic channel.

It is contemplated that the controller is further adapted to include the message having the CBS indication in a point-to-multipoint information message. It is further contemplated that the controller is further adapted to include the message having the CBS indication in a broadcast control scheduling message.

It is contemplated that the first channel is a point-to-multipoint control channel. It is further contemplated that the controller is further adapted to transmit the message having the CBS indication during a modification period and to transmit the CBS data during a corresponding modification period.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed. These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 8 is a diagram illustrating a first level scheduling.

FIG. 11 is a flowchart illustrating a method according to second embodiment of the present invention.

FIG. 12 is a flowchart illustrating a method according to a third embodiment of the present invention.

DETAILED DESCRIPTION OF THE PREFERRED EMBODIMENTS

Figure 1:
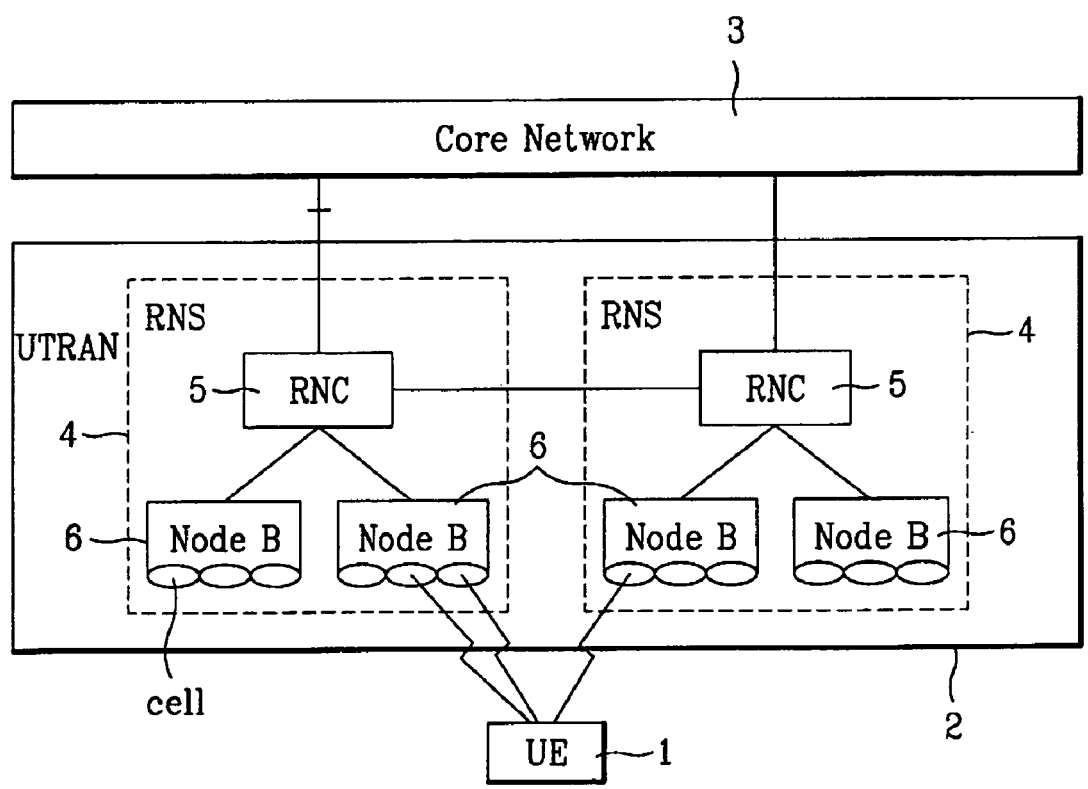
FIG. 1 is a block diagram illustrating a network structure of a UMTS (universal mobile telecommunications system) of a 3GPP asynchronous IMT-2000 system.
Figure 2:
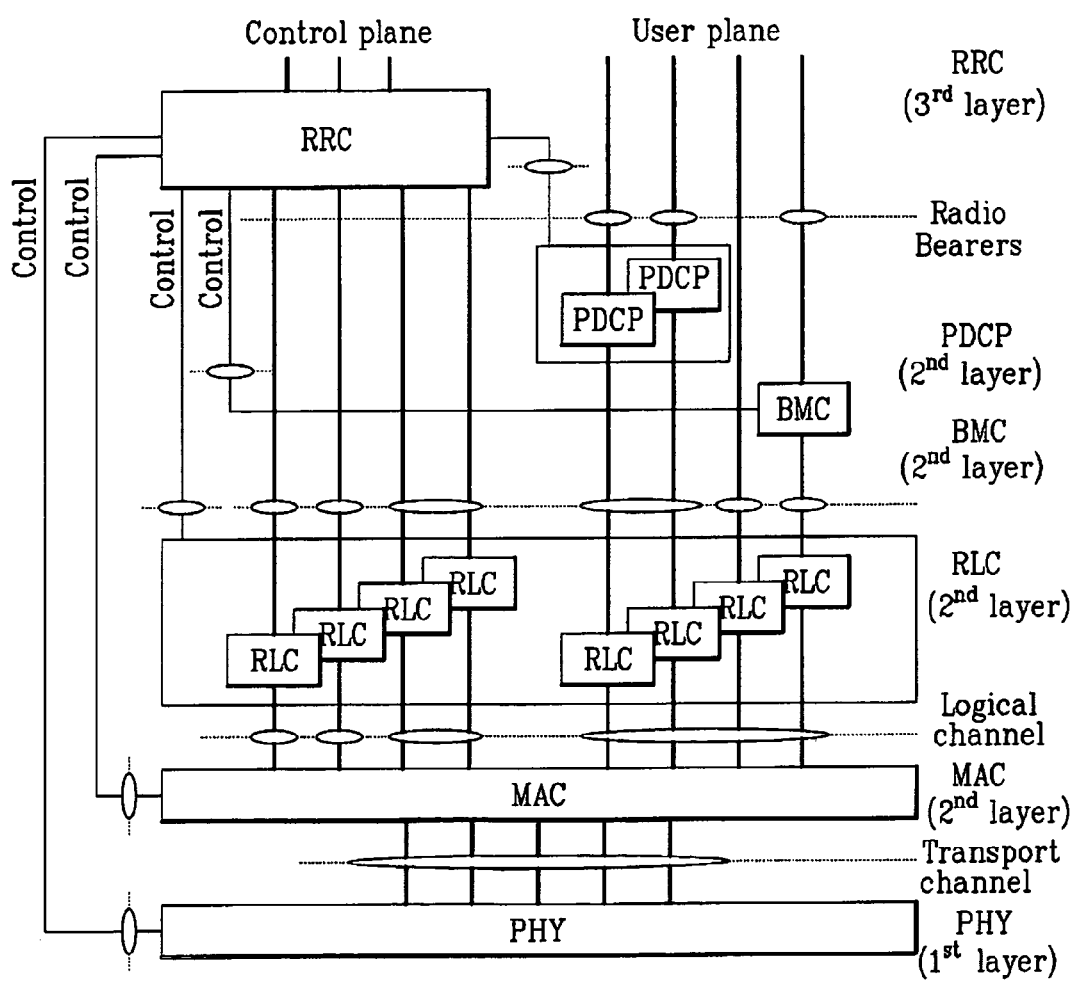
FIG. 2 is an architectural diagram illustrating a radio interface protocol used by a UMTS.
Figure 3:
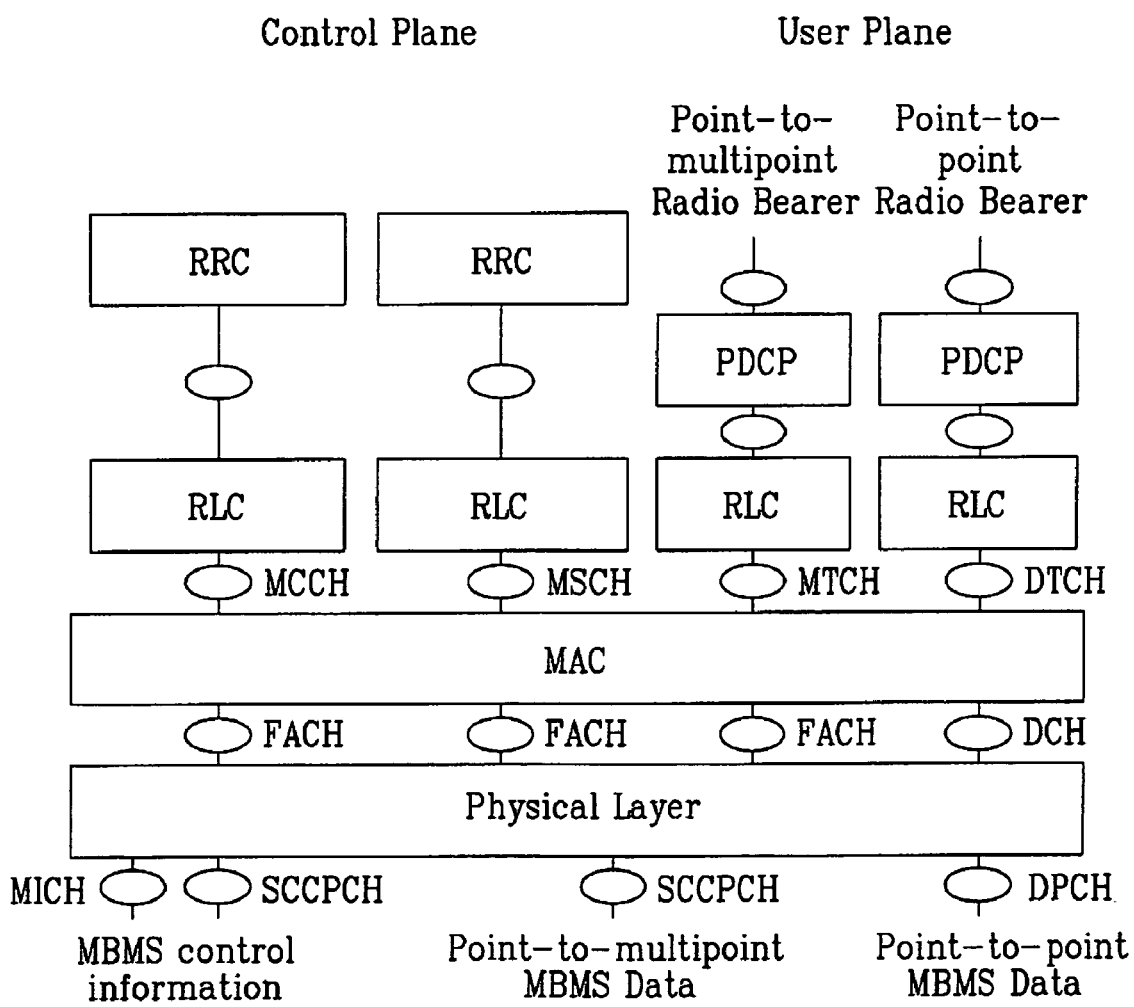
FIG. 3 is a diagram illustrating a conventional channel configuration for an MBMS in a UE.
Figure 4:
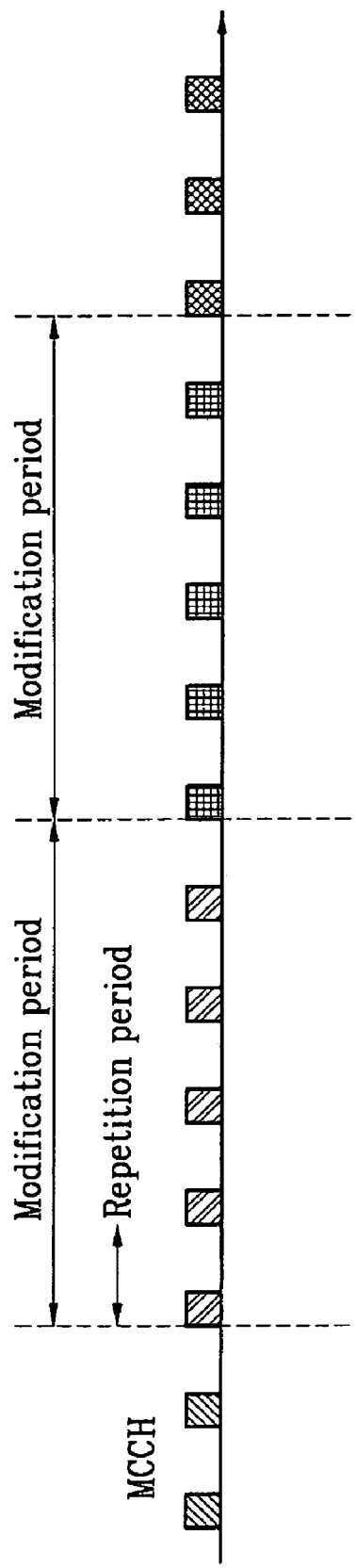
FIG. 4 is a diagram illustrating a transmission method of MCCH information.
Figure 5:
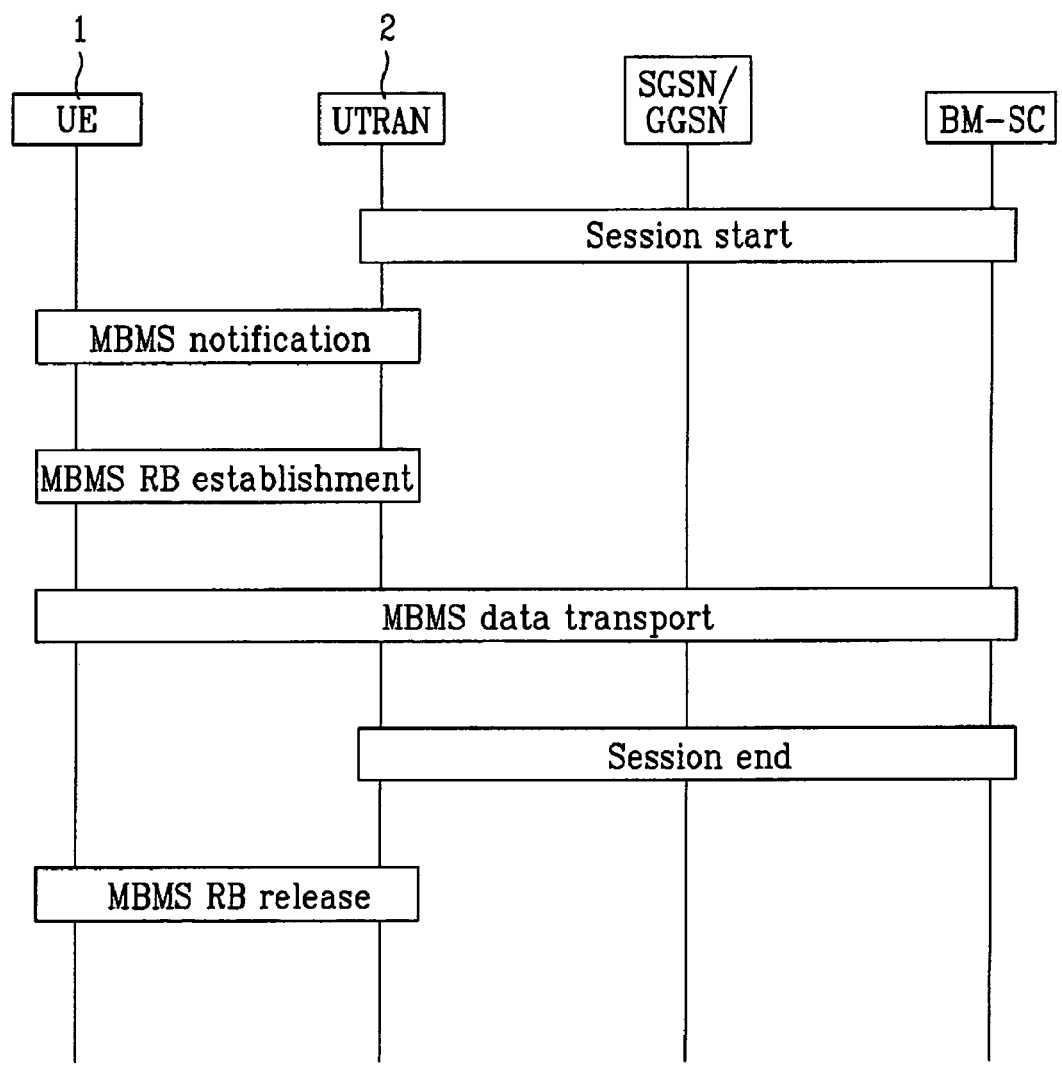
FIG. 5 is a flowchart illustrating a conventional procedure for providing an MBMS.
Figure 6:
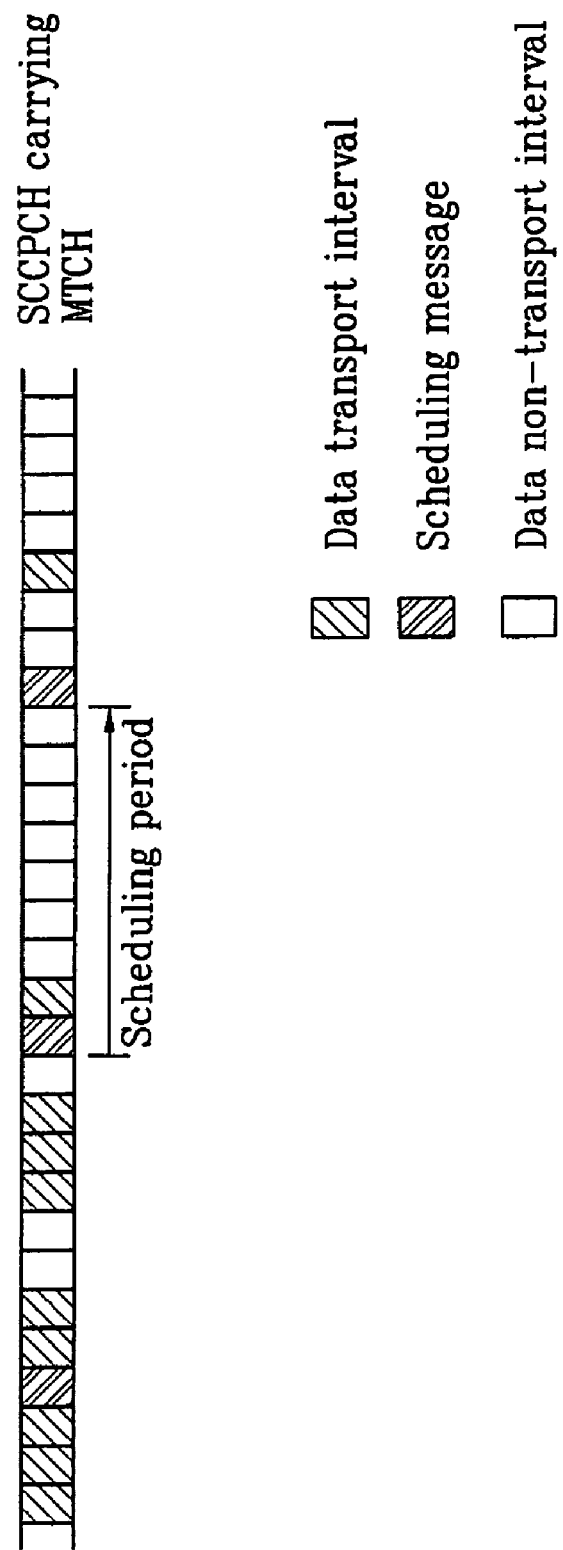
FIG. 6 is a diagram illustrating discontinuous transmission of MBMS data via an MTCH.
Figure 7:
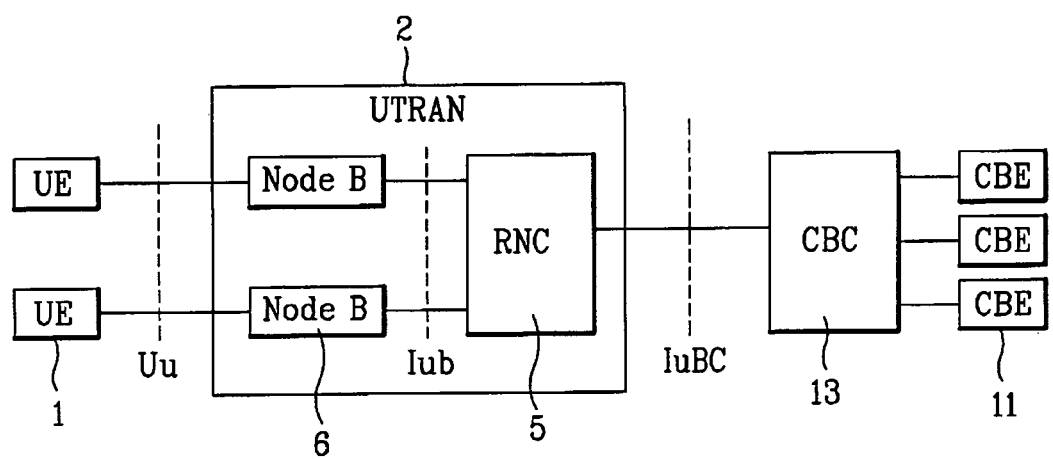
FIG. 7 is a block diagram illustrating a network structure for a cell broadcast service.

The present invention relates to a method and apparatus for providing and receiving a plurality of services via a single channel in a mobile communications system, by which a plurality of the services can be effectively provided via the single channel. Although the present invention is illustrated with respect to a mobile communication device, it is contemplated that the present invention may be utilized anytime it is desired to effectively provide plurality of services via a single channel.

Reference will now be made in detail to the preferred embodiments of the present invention, examples of which are illustrated in the accompanying drawings. Wherever possible, the same reference numbers will be used throughout the drawings to refer to the same or like parts.

The present invention discloses a method and apparatus for receiving control information for an MBMS and a CBS via a control channel of the MBMS and receiving both the MBMS and the CBS via a single physical channel. The method and apparatus enable a wireless mobile terminal to receive the MBMS and CBS simultaneously via the single physical channel.

A wireless mobile terminal according to the present invention receives a control channel for an MBMS, acquires control information for a CBS that is transmitted via the control channel and receives the CBS according to the acquired control information. Preferably, the control channel for the MBMS is an MCCH and the control information includes information for a CTCH.

A UTRAN maps a CTCH and an MBMS channel to the same physical channel for transmission. Specifically, the CTCH and MCCH in a corresponding cell are mapped to the same SCCPCH for transmission. Alternatively, the CTCH and MTCH may be mapped to the same SCCPCH for transmission. Alternatively, the CTCH and MSCH may be mapped to the same SCPCH for transmission.

The UTRAN maps information of the CTCH and CTCH establishment information to the terminal as part of a system information block transmitted as part of BCCH or MCCH information transmitted via an MCCH. Preferably, the MCCH information is an MBMS information message or an MBMS point-to-multipoint radio bearer information message. The CTCH establishment information can include logical channel information for CTCH, CTCH-mapped transport channel and physical channel information, RLC layer information for CTCH, MAC layer information or physical layer information.

The terminal receives mapping information related to the CTCH and the CTCH establishment information as part of system information transmitted as part of BCCH or MCCH information transmitted via an MCCH. The terminal then receives the CTCH together with the MBMS channel via a single physical channel, SCCPCH, which uses the same channel code.

A CTCH indicator is established in MBMS point-to-multipoint radio bearer information included in MCCH information in order to indicate that a specific logical channel is for CTCH channel transmission. It may be indicated that the CTCH is mapped to a physical channel carrying MCCH or MTCH for transmission. This indication can be provided by a message indicating MCCH establishment information or MTCH establishment information in a system information block transmitted via a BCCH. Preferably, the message includes a CTCH indicator indicating to which logical channel the CTCH corresponds, with the logical channel mapped to the physical channel.

Figures 9, 10:
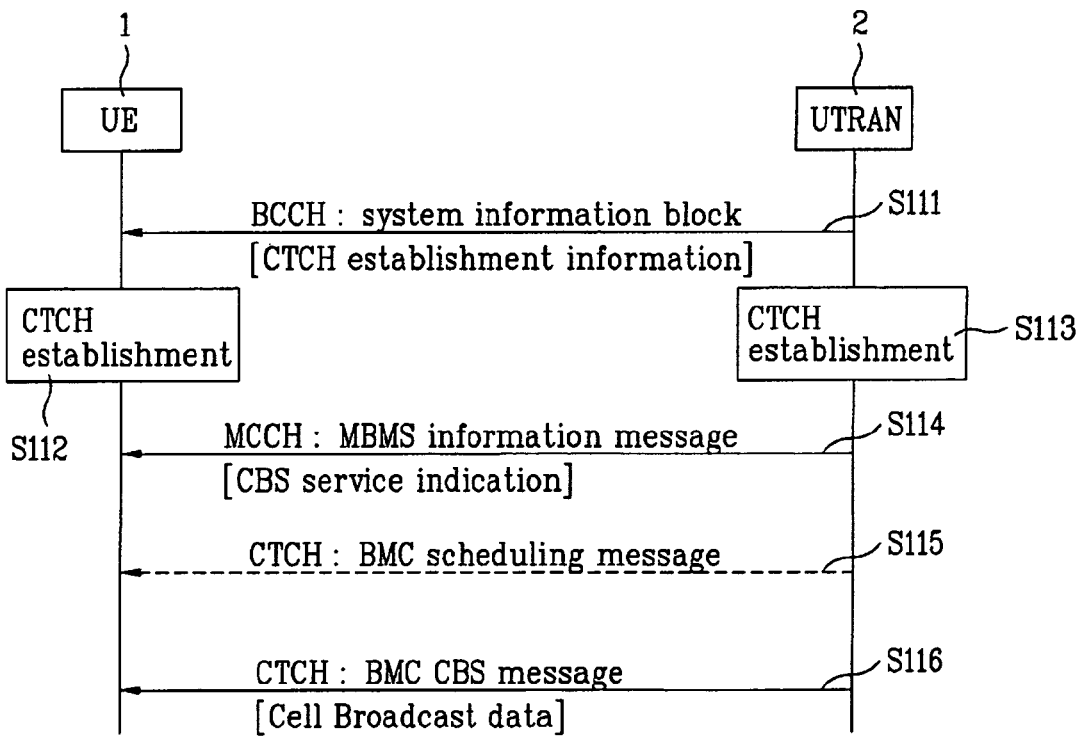
FIG. 9 is a configurational diagram illustrating a conventional BMC schedule message.
FIG. 10 is a flowchart illustrating a method according to a first embodiment of the present invention.

FIG. 10 is a flowchart of a method according to one embodiment of the present invention. As illustrated in FIG. 10, CTCH and MCCH logical channels may be carried by the same physical channel or may be carried by different physical channels.

The UTRAN includes CTCH establishment information in a BCCH system information block and then transmits the system information block to a UE. The UE receives the system information block via the BCCH and then acquires the CTCH establishment information (S111). The UTRAN and UE establish a CTCH to transmit/receive a CBS using the CTCH establishment information (S112, S113).

If there is a CBS transmission during a specific modification MCCH period, the UTRAN includes CBS indication information in an MBMS service information message during an MCCH modification period (S114). The modification period in which the CBS transmission occurs and the modification period in which the CBS indication message is sent may be the same. On the other hand, the modification period in which the CBS indication message is sent may be a modification period in advance of the modification period in which the CBS transmission occurs.

Upon acquiring the CBS indication information by receiving the MBMS information message during the MCCH modification period, the UE receives the CTCH during the specific modification period. If a broadcast/multicast control (BMC) scheduling message is transmitted via CTCH, the UE receives the BMC scheduling message (S115).

The UE receives a BMC CBS message via the CTCH during the specific modification period (S116). If the BMC scheduling message was received via the CTCH in step S115, the UE discontinuously receives the BMC CBS message using the BMC scheduling message. Having received the BMC CBS message, the UE acquires cell broadcast data corresponding to the specific CBS included in the message.

FIG. 11 is a flowchart illustrating a method according to another embodiment of the present invention. As illustrated in FIG. 11, if there is a CBS transmission during a specific MCCH modification period, the UTRAN includes CBS indication information in an MBMS service information message during an MCCH modification period (S211). The modification period in which the CBS indication information is sent and the modification period in which the CBS transmission occurs may be the same. On the other hand, the modification period in which the CBS indication information is sent may be a modification period in advance of the modification period in which the CBS transmission occurs.

If a physical channel other than MCCH carries the MTTCH and the CTCH, the UTRAN includes CTCH establishment information in an MCCH MBMS point-to-multipoint radio bearer information message and then transmits the message to the UE (S212). Preferably, the MBMS point-to-multipoint radio bearer information message includes a CTCH indicator indicating to which logical channel the CTCH corresponds, with the logical channel mapped to a physical channel.

The UE receives the MBMS point-to-multipoint radio bearer information message and acquires the CTCH establishment information (S212). The UTRAN and UE then establish a CTCH to transmit/receive a CBS message using the CTCH establishment information (S213, S214).

Upon acquiring the CBS indication information by receiving the MBMS information message during the MCCH modification period, the UE receives the CTCH during the specific modification period. If a BMC scheduling message is transmitted via CTCH, the UE receives the BMC scheduling message (S215).

The UE receives a BMC CBS message via the CTCH during the specific modification period (S216). If the BMC scheduling message was received via CTCH in step S215, the UE discontinuously receives the BMC CBS message using the BMC scheduling message. Having received the BMC CBS message, the UE acquires cell broadcast data corresponding to the specific CBS included in the message (S216).

FIG. 12 is a flowchart illustrating a method according to another embodiment of the present invention. As illustrated in FIG. 12, if there is a CBS transmission during a specific MCCH modification period, the UTRAN includes CBS indication information in an MBMS service information message during an MCCH modification period and then transmits the message to a UE (S311). The modification period in which the CBS indication information is sent and the modification period in which the CBS transmission occurs may be the same. On the other hand, the modification period in which the CBS indication information is sent may be a modification period in advance of the modification period in which the CBS transmission occurs.

If different physical channels carry the MTCH and MCCH, the UTRAN includes MTCH establishment information in an MCCH MBMS point-to-multipoint radio bearer information message and then transmits the message to the UE (S312). The MBMS point-to-multipoint radio bearer information message indicates that the MTCH is the logical channel carrying the transmitted CBS message.

The UE receives the MBMS point-to-multipoint radio bearer information message and acquires the MTCH establishment information (S312). The UTRAN and UE then establish an MTCH to transmit/receive the CBS using the MTCH establishment information (S313, S314).

Upon acquiring the CBS indication information by receiving the MBMS information message during the MCCH modification period, the UE receives MTCH during the specific modification period via a physical channel carrying the MTCH as well the MTCH (S315). If BMC scheduling message is transmitted via the MTCH, the UE receives the BMC scheduling message (S315).

The UE receives a BMC CBS message via the MTCH during the specific modification period. If the BMC scheduling message was received via MTCH in step S315, the UE discontinuously receives the BMC CBS message using the BMC scheduling message. Having received the BMC CBS message, the UE acquires cell broadcast data corresponding to the specific CBS included in the message (S316).

Figure 13:
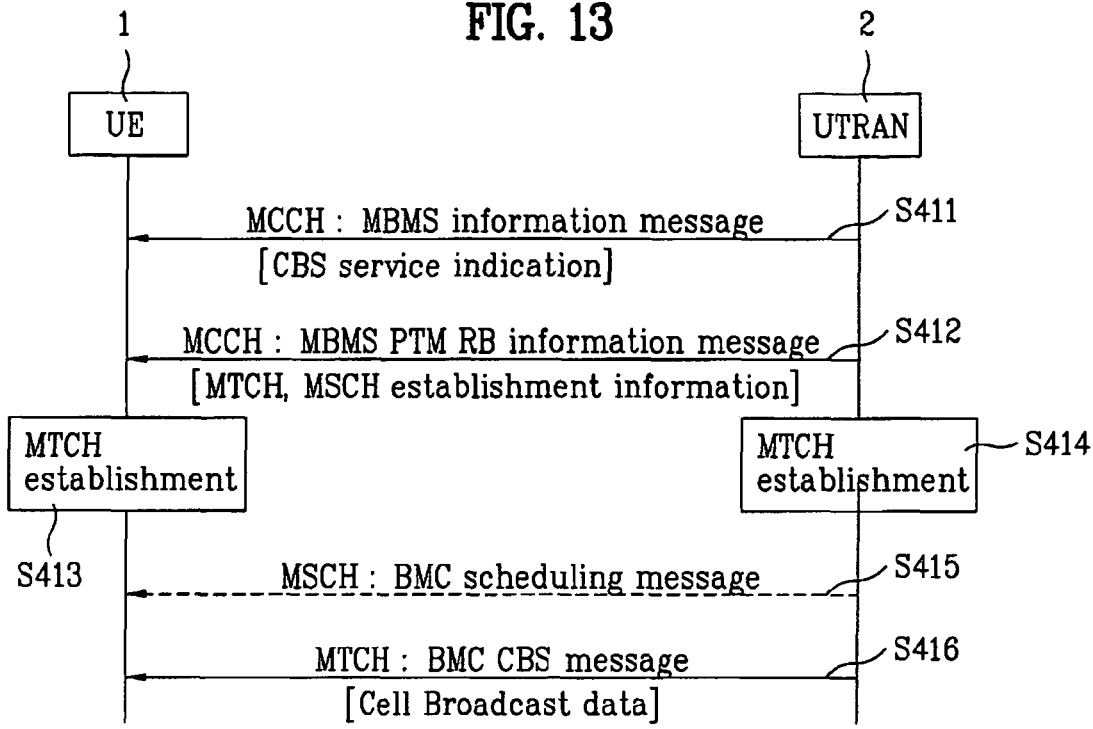
FIG. 13 is a flowchart illustrating a method according to fourth embodiment of the present invention.

FIG. 13 is a flowchart illustrating a method according to another embodiment of the present invention. As illustrated in FIG. 13, if there is a CBS transmission during a specific MCCH modification period, the UTRAN includes CBS indication information in an MBMS service information message during an MCCH modification period and then transmits the message to a UE (S411). The modification period in which the CBS indication information is sent and the modification period in which the CBS transmission occurs may be the same. On the other hand, the modification period in which the CBS indication information is sent may be a modification period in advance of the modification period in which the CBS transmission occurs.

If different physical channels carry the MTCH and MCCH, the UTRAN includes MTCH establishment information in an MCCH MBMS point-to-multipoint radio bearer information message and then transmits the message to the UE (S412). The MBMS point-to-multipoint radio bearer information message indicates that the MTCH is the logical channel carrying the transmitted CBS message.

The UE receives the MBMS point-to-multipoint radio bearer information message and acquires the MTCH establishment information (S412). The UTRAN and UE then establish an MTCH to transmit/receive CBS using the MTCH establishment information (S413, S414).

Upon acquiring the CBS indication information by receiving the MBMS information message during the MCCH modification period, the UE receives the MSCH during the specific modification period via a physical channel carrying the MTCH as well as the MTCH (S415). If the UTRAN transmits a BMC scheduling message via the MSCH, the UE receives the BMC scheduling message (S415).

The UE receives a BMC CBS message via the MTCH during the specific modification period. If the BMC scheduling message was received via the MSCH in step S415, the UE discontinuously receives the BMC CBS message using the BMC scheduling message (S416). Having received the BMC CBS message, the UE acquires cell broadcast data corresponding to the specific CBS included in the message (S416).

Figure 14:
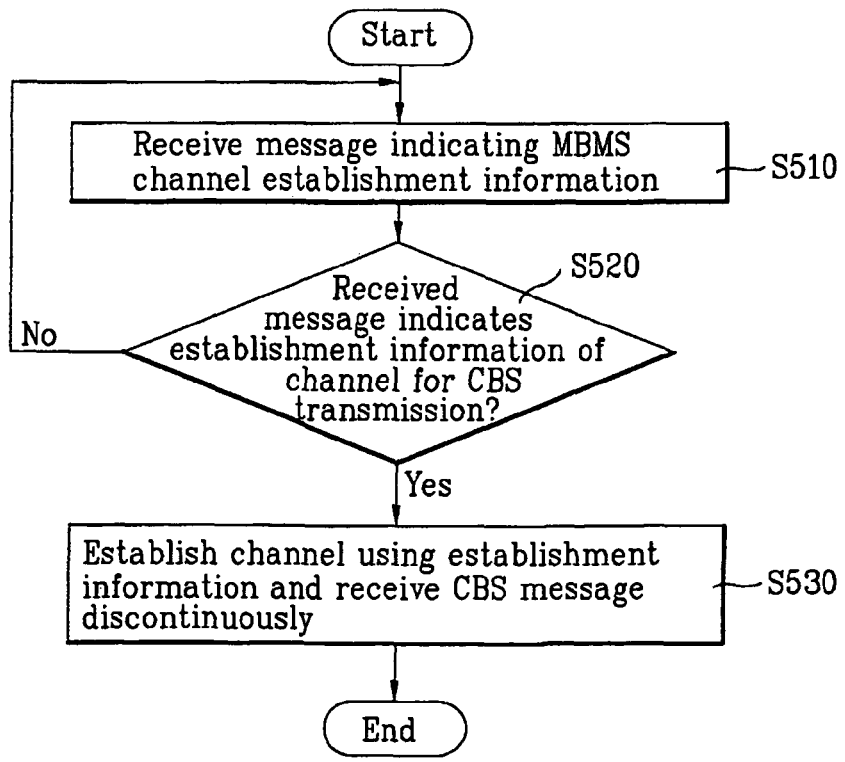
FIG. 14 is a flowchart illustrating a method in a user equipment according to a first embodiment of the present invention.

FIG. 14 is a flowchart illustrating a user equipment according to one embodiment of the present invention. As illustrated in FIG. 14, a UE receives a message indicating MBMS channel establishment information via the BCCH or MCCH (S510). The MBMS channel is MCCH, MTCH or MSCH. The message is a system information block of a BCCH or MBMS point-to-multipoint radio bearer information message of the MCCH.

The UE checks whether the received message includes information indicating that a specific radio bearer for CBS transmission or a specific logical channel for CBS transmission is CTCH or MTCH (S520). If the message does not include information indicating that a specific radio bearer for CBS transmission or a specific logical channel for CBS transmission is CTCH or MTCH, the UE re-executes step S510.

If the message includes information indicating that a specific radio bearer for CBS transmission or a specific logical channel for CBS transmission is CTCH or MTCH, the UE establishes the CTCH or MTCH for CBS transmission using the establishment information and then discontinuously receives a CBS message using the established channel (S530) according to the CBS indication information or scheduling information. Preferably, the CBS message is transmitted by a BMC layer of a UTRAN and is received by a BMC layer of the UE.

Figure 15:
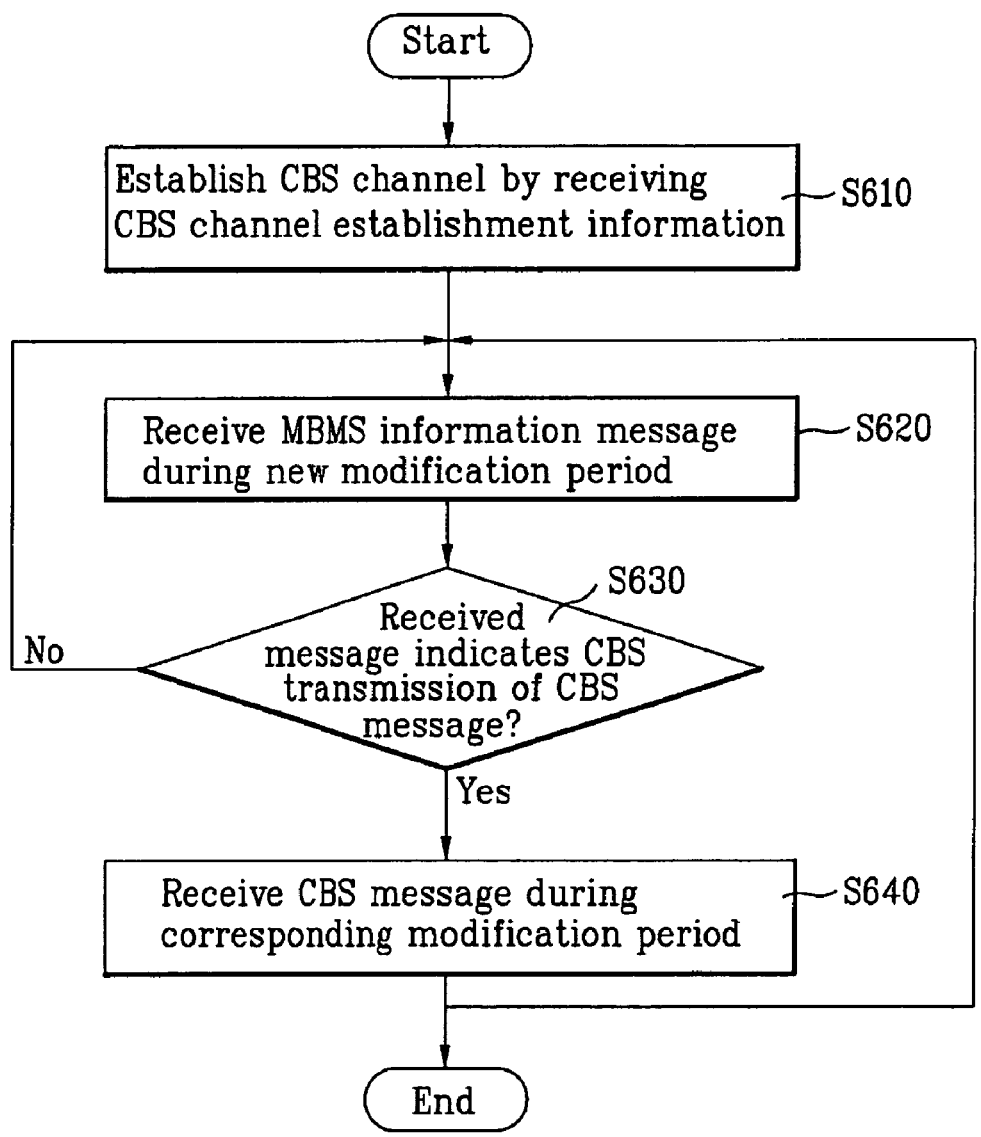
FIG. 15 is a flowchart illustrating a method in a user equipment according to a second embodiment of the present invention.

FIG. 15 is a flowchart illustrating a user equipment according to another embodiment of the present invention. As illustrated in FIG. 15, a UE receives CBS channel establishment information, as illustrated in step S111 of FIG. 10, in order to receive a CBS and then establishes a CBS channel. The CBS channel indicates a logical channel, CTCH or MTCH, for transmitting the CBS (S610).

The UE periodically receives the MCCH. The UE receives an MBMS information message during a new MCCH modification period (S620). The UE checks whether the received message indicates that a CBS message is transmitted during a current or specific modification period (S630). If it is not indicated that a CBS message is transmitted, the UE re-executes step (S620). If it is indicated that a CBS message is transmitted, the UE receives the CBS message via the established CBS channel during the modification period (S640), as illustrated in step S116 of FIG. 10.

Although the embodiments of the present invention have been explained with reference to a mobile communications system, the technical features of the present invention are applicable to any wireless communication system, such as a PDA (personal digital assistant) and a notebook computer equipped with a wireless communication function. Terms used in describing the present invention are not limited to a range of a wireless communication system such as UMTS, as the present invention is applicable to other wireless communication systems using different wireless interfaces and physical layers, such as TDMA, CDMA and FDMA.

The technical features of the present invention can be implemented with software, firmware, hardware or combinations of the software, firmware and/or hardware. Specifically, the contents of the present invention may be implemented with hardware using a code, circuit chip and hardware logic, such as ASIC, or with code in a storage medium readable by a computer, such as a hard disc, a floppy disc or a tape, or in optical storage, ROM or RAM using a computer programming language.

Code stored in a computer readable medium is accessible by a processor and can be executed. Code for implementing contents of the present invention is accessible via a transport medium or via a file server on a network. A device implemented with the code is configured to include a wire transport medium such as a network transport line, a wireless transport medium, a signal transfer, a radio signal or an infrared signal.

Figure 16:
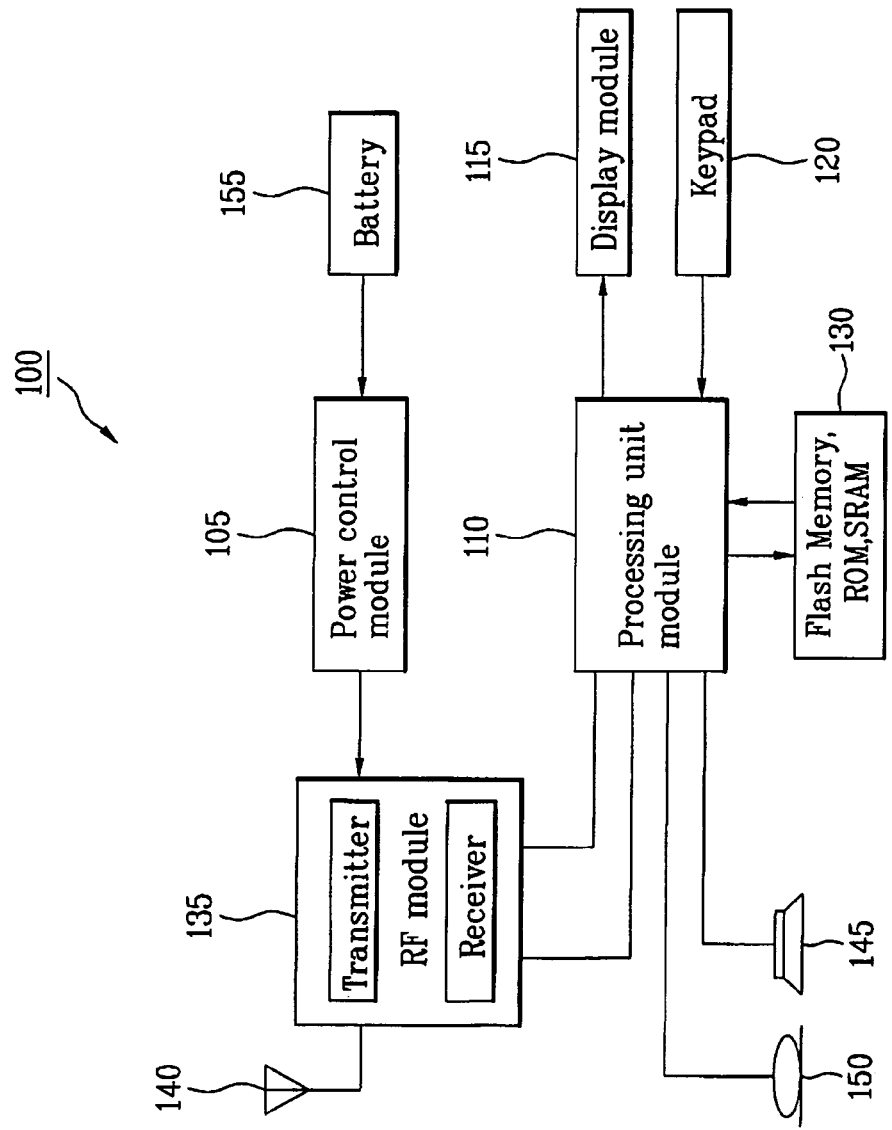
FIG. 16 is a block diagram of a radio communication apparatus, such as a mobile terminal, which performs functions of the present invention.

FIG. 16 is a block diagram illustrating a wireless communication apparatus, such as a mobile terminal, which performs functions of the present invention. As illustrated in FIG. 16, a wireless communication apparatus 100 includes a processing unit 110, such as a microprocessor or a digital processor, an RF module 135, a power control module 106, an antenna unit 140, a battery 155, a display module 115, a keypad 120, a storage module 130, such as a ROM, an SRAM or a flash memory, a speaker 145 and a microphone 150.

A user inputs command information, such as a phone number, by pressing buttons of the keypad 120 or activates sound using the microphone 145. The processing unit 110 receives and processes the command information in order to perform a function requested by the user.

The processing unit 110 searches the storage module 130 for data needed to perform the function. The processing unit 110 displays the user's command information and the data retrieved from the storage module 130 via the display module 115 for the user's convenience.

The processing unit 110 delivers instruction information to the RF module 135 in order to transmit radio signals including voice communication data. The RF module 135 includes a transmitter and a receiver in order to transmit and receive radio signals. The radio signals are transmitted or received via an antenna.

The RF module 135 is used in receiving data from a network or transmitting information measured or generated from the wireless communication apparatus to the network. Upon receiving the radio signal, the RF module 135 converts the radio signal to a baseband frequency to enable the processing unit 10 to process the radio signal. The converted signal is delivered via the speaker 145 or as readable information.

The storage module 130 is used in storing the information measured or generated from the wireless communication apparatus. The wireless communication apparatus uses the processing unit module 110 to receive data, process the received data and transmit the processed data.

The present invention provides advantages over the prior art. A wireless mobile terminal receives control information for an MBMS and a CBS via a control channel of MBMS and receives the MBMS and CBS via a single physical channel according to the control information. Therefore, a wireless mobile terminal attempting to receive both an MBMS and a CBS simultaneously can effectively do so by receiving the single physical channel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of receiving a cell broadcast service in a mobile terminal adapted for use in a wireless communication system, the method comprising:
    receiving information through a first channel, the information indicating a first period of transmitting a message having a cell broadcast service (CBS) indication, wherein the CBS is not a multimedia service;
    periodically receiving the message having the CBS indication through a second channel, the message received periodically according to the first period indicated by the information received through the first channel, wherein the CBS indication indicates a second period of transmitting CBS data; and
    receiving the CBS data in response to the CBS indication, wherein the first period refers to a regular interval at which the message having the CBS indication is repeated.

2. The method of claim 1, wherein the first channel is a broadcast control channel.

3. The method of claim 1, wherein the second channel is a point-to-multipoint channel.

4. The method of claim 1, further comprising periodically receiving the second channel.

5. The method of claim 1, further comprising receiving the CBS data via a point-to-multipoint channel.

6. The method of claim 5, wherein the point-to-multipoint channel is a cell broadcast traffic channel.

7. The method of claim 1, wherein receiving the message having the CBS indication comprises receiving a point-to-multipoint information message.

8. The method of claim 1, wherein receiving the message having the CBS indication comprises receiving a broadcast control scheduling message.

9. The method of claim 1, wherein the first channel is a point-to-multipoint control channel.

10. The method of claim 1, wherein receiving the message having the CBS indication comprises receiving during a modification period and receiving the CBS data comprises receiving during a corresponding modification period.

11. A method of communicating a cell broadcast service in a wireless communication system, the method comprising:
    transmitting information through a first channel, the information indicating a first period of transmitting a message having a cell broadcast service (CBS) indication, wherein the CBS is not a multimedia service;
    periodically transmitting the message having the CBS indication through a second channel, the message provided periodically according to the first period, wherein the CBS indication indicates a second period of transmitting CBS data; and
    transmitting the CBS data corresponding to the CBS indication,
    wherein the first period refers to a regular interval at which the message having the CBS indication is repeated.

12. The method of claim 11 wherein the first channel is a broadcast control channel.

13. The method of claim 11 wherein the second channel is a point-to-multipoint channel.

14. The method of claim 11 wherein transmitting the CBS data comprises transmitting via a point-to-multipoint channel.

15. The method of claim 14, wherein the point-to-multipoint channel is a cell broadcast traffic channel.

16. The method of claim 11 wherein transmitting the message having the CBS indication comprises transmitting a point-to-multipoint information message.

17. The method of claim 11 wherein transmitting the message having the CBS indication comprises transmitting a broadcast control scheduling message.

18. The method of claim 11 wherein the first channel is a point-to-multipoint control channel.

19. The method of claim 11 wherein transmitting the message having the CBS indication comprises transmitting during a modification period and transmitting the CBS data comprises transmitting during a corresponding modification period.

20. A mobile terminal adapted for use in a wireless communication system, the mobile terminal comprising:
    an antenna unit configured to receive RF signals comprising information indicating a first period of transmitting a message having a cell broadcast service (CBS) indication, wherein the CBS is not a multimedia service, the antenna unit further configured to receive RF signals comprising CBS data, wherein the CBS indication indicates a second period of transmitting the CBS data;
    an RF unit configured to process the RF signals received by the antenna unit;
    a keypad for receiving command information from a user;
    a storage unit configured to store the information, the CBS indication and the CBS data;
    a display configured to convey information to the user; and
    a processing unit configured to process the information received through a first channel, process the message having the CBS indication received periodically through a second channel and process the CBS data,
    wherein the message having the CBS indication is received periodically and processed according to the first period and the CBS data is processed in response to the CBS indication,
    wherein the first period refers to a regular interval at which the message having the CBS indication is repeated.

21. The mobile terminal of claim 20, wherein the first channel is a broadcast control channel.

22. The mobile terminal of claim 20, wherein the second channel is a point-to-multipoint channel.

23. The mobile terminal of claim 20, wherein the processing unit is further configured to periodically process the second channel.

24. The mobile terminal of claim 20, wherein the processing unit is further configured to process the CBS data via a point-to-multipoint channel.

25. The mobile terminal of claim 24, wherein the point-to-multipoint channel is a cell broadcast traffic channel.

26. The mobile terminal of claim 20, wherein the processing unit is further configured to process a point-to-multipoint information message comprising the message having the CBS indication.

27. The mobile terminal of claim 20, wherein the processing unit is further configured to process a broadcast control scheduling message comprising the message having the CBS indication.

28. The mobile terminal of claim 20, wherein the first channel is a point-to-multipoint control channel.

29. The mobile terminal of claim 20, wherein the processing unit is further configured to process the message having the CBS indication during a modification period and to process the CBS data during a corresponding modification period.

30. A network for providing a point-to-multipoint service to at least one mobile terminal, the network comprising:
    at least one transmitter configured to transmit signals comprising information indicating a first period of transmitting a message having a cell broadcast service (CBS) indication, wherein the CBS is not a multimedia service, the at least one transmitter further configured to transmit signals comprising CBS data, wherein the CBS indication indicates a second period of transmitting the CBS data;
    a CBS unit configured to generate the CBS data; and
    a controller configured to control the at least one transmitter to transmit the information indicating the first period through a first channel, transmit the message having the CBS indication through a second channel and transmit the CBS data,
    wherein the message having the CBS indication is provided periodically according to the first period and the CBS data is transmitted according to the CBS indication,
    wherein the first period refers to a regular interval at which the message having the CBS indication is repeated.

31. The network of claim 30 wherein the first channel is a broadcast control channel.

32. The network of claim 30 wherein the second channel is a point-to-multipoint channel.

33. The network of claim 30 wherein the controller is further configured to transmit the CBS data via a point-to-multipoint channel.

34. The network of claim 33, wherein the point-to-multipoint channel is a cell broadcast traffic channel.

35. The network of claim 30 wherein the controller is further configured to include the message having the CBS indication in a point-to-multipoint information message.

36. The network of claim 30 wherein the controller is further configured to include the message having the CBS indication in a broadcast control scheduling message.

37. The network of claim 30 wherein the first channel is a point-to-multipoint control channel.

38. The network of claim 30 wherein the controller is further configured to transmit the message having the CBS indication during a modification period and to transmit the CBS data during a corresponding modification period.

* * * * *